M. B. BENSON.
MASTER CONTROLLER FOR TELEMOTORS.
APPLICATION FILED DEC. 11, 1920.
1,409,356.
Patented Mar. 14, 1922.
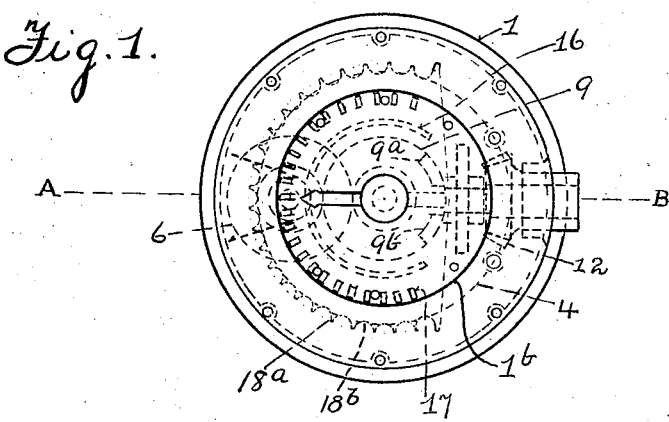
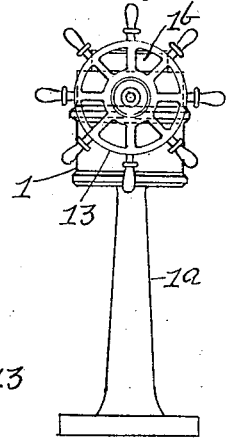
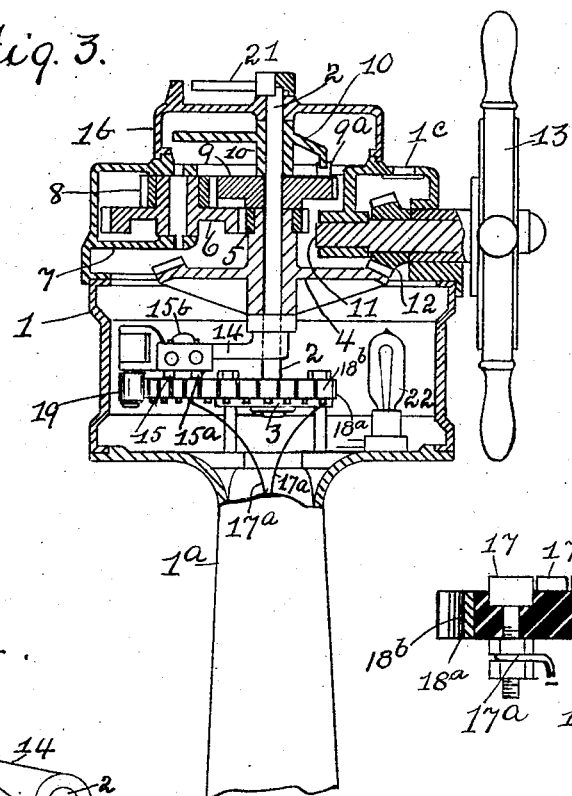

UNITED STATES PATENT OFFICE.

MELVIN B. BENSON, OF SUPERIOR, WISCONSIN.

MASTER CONTROLLER FOR TELEMOTORS.

1,409,356. Specification of Letters Patent. Patented Mar. 14, 1922.

Application filed December 11, 1920. Serial No. 430,097.

*To whom it may concern:*

Be it known that I, MELVIN B. BENSON, a citizen of the United States, residing at Superior, in the county of Douglas and State of Wisconsin, have invented certain new and useful Improvements in Master Controllers for Telemotors, of which I do declare the following to be a specification.

My invention relates to master controllers for electric telemotors, and has for its object the provision of an improved form of such structure. It has for one of its special objects the provision of means preferably so positioned, geared and arranged as to operate slowly approximately as a hand-operated cable steering gear responds in speed to the effort of the steersman, it being recognized that many steersmen on ship are sometimes exceedingly reluctant to operate a steering gear that has a remote external appearance to a street car controller, or that responds so rapidly in action as to make entire rotation of a steering wheel unnecessary.

It has for a further object the provision of means for causing a travelling contact to pass suddenly from one to another of a plurality of stationary contacts, whereby the tendency to form or maintain an arc is modified or obviated. With these and other objects in view, it consists of the structures, combinations and arrangements of parts hereinafter described and claimed.

In the drawings, Fig. 1, is a top plan view of my said invention, omitting the hereinafter described external operating wheel, and showing certain interior parts in broken lines. Fig. 2, is a rear elevation of said invention. Fig. 3, is a side elevation of said invention, partly broken away and partly in vertical section on the line A—B of Fig. 1. Fig. 4, is a detail bottom plan view of the hereinafter described travelling contact arm. Fig. 5, is a central vertical section through the stationary contact table.

In the drawings, 1 is a casing of any suitable structure, preferably mounted upon a hollow pedestal 1ª, and preferably provided with a cover 1ᵇ. Positioned within said casing, and preferably extending upwardly a short distance outwardly of the same, is a rotatable shaft 2, mounted in any suitable bearings, as at one end in said cover, and at the opposite end in a spider 3. Journalled on said shaft is a gear 4, the hub of which is provided with a pinion 5, adapted to turn therewith and to engage a gear 6, which is preferably mounted upon a bracket 7, extending inwardly from the side of said casing. The hub of said gear 6 is provided with a pinion 8, adapted to turn therewith and to engage a gear 9, journalled upon said shaft 2, which gear 9, is provided upon its upper face with a stop or stops 9ª, 9ᵇ, of any suitable structure, adapted to engage a finger 10ª, extending from said shaft, or from a collar 10, keyed or pinned to said shaft; the structure being such that a little play is preferably provided for between said stop or stops and said finger, said gear 9 being adapted, through the engagement of said stop or stops with said finger, to turn said shaft.

Mounted in any suitable bearings is a shaft 11 extending outwardly of said casing. Upon the inward end of said shaft 11, is pinned or keyed a pinion 12, adapted to engage and turn said gear 4. Upon the outer end of said shaft 11, is keyed an operating lever of any suitable structure, preferably a wheel 13, similar to a ship's steering wheel.

Keyed or pinned to said shaft 2, is an arm 14, by which is carried an electric bridge contact preferably comprising two points 15, 15ª, connected together by a bridge 15ᵇ, which contact is insulated from said arm in any suitable manner and by any suitable insulating means. Said contact is adapted to operate as an electric circuit-closing bridge between any one or another of a plurality of normally open electric contacts comprising respectively a stationary contact rail 16, and corresponding members of a plurality of stationary spaced contact points 17, said bridge contact being adapted to be moved by said arm along said rail in continuous contact therewith and from one to another of said spaced contact points. Said rail and stationary points are insulated by any suitable means or in any suitable manner from other portions of the structure, as by a table or segment of insulating material 18, upon which they are preferably mounted. Connected to said rail is an electric conductor 16ª extending directly or indirectly to one pole of a source of electricity, not shown, and connected to each member of said plurality of points are conductors 17ª extending directly or indirectly to the other pole of said source, it being understood that one or the other of these conductors will include one or more translation devices, not shown, as is well known in telemotor construction.

Said segment 18 is preferably corrugated in its periphery, or a corrugated metallic or hard material wearing facing of any suitable structure, as 18$^a$, is secured to the edge thereof, the depressed portion 18$^b$ of each corrugation being opposite the center of a corresponding one of said plurality of stationary contacts respectively, and on a radial line projected through such corrugation and through such corresponding contact and through said shaft 2, which corrugations are adapted to receive and engage a dog of any suitable structure, preferably a roller 19, which is mounted upon a lever 20 intermediate of the ends thereof, which lever is pivoted at one end to the free end of said contact arm, and at its opposite end is anchored by resilient or elastic means, as by a spring 20$^a$, to any suitable anchorage nearer the base of said arm and adapted to turn therewith, as to a lug 20$^b$ extending from the base of said arm itself. Upon the outer end of said shaft 2, is keyed or pinned a pointer 21 adapted to indicate the position at any time of the travelling contact on its path of travel. If desired, said wheel 13 may be removed, and said shaft and contact arm may be moved by means of any suitable lever applied to said shaft 2, as by said pointer 21.

A signal lamp 22 is preferably interposed in the circuits of said normally open contacts to disclose when any of said circuits is closed. The light of said lamp may be observed through one or more peep holes 1$^c$ formed in said casing.

In operation the wheel 13 is rotated manually, the speed and travel between said wheel and said shaft 2 preferably being considerably reduced by gearing down as will be obvious, thus requiring the wheelsman in accordance with the tradition of the trade to spin the wheel in order to move the helm from central position to hard over, or in order to move the contact arm from central position to hard over.

The contact arm, being swung on its axis by said wheel 13, and shaft 2 and intermediate transmission mechanism, moves said lever 14 and roller 19 along the corrugated periphery of said contact table or segment, the anchoring spring 21$^a$ yielding to permit said roller to pass around the outer terminals of the respective recesses in said corrugated periphery, and then contracting sharply to snap the roller into the succeeding recess, the effect of which is to very greatly and briefly accelerate the movement of said contact arm, whereby the travelling contact is jumped quickly from one to another of said stationary contacts and the tendency to arc is thereby prevented or very greatly modified. It will be observed that the last above operation—the acceleration of the contact arm—makes advisable some play somewhere in the transmission between said arm and said wheel 13, which I have preferably provided between said stops 9$^a$, 9$^b$, and said finger 10$^a$, the amount of play required being very little.

It is obvious that the construction of my invention may be modified or altered in various details within the spirit and scope of my claim.

What I claim is—

In a master controller for telemotors, the combination with a casing, of a rotatable shaft positioned therein, a second rotatable shaft positioned in said casing and extending outwardly thereof, an operating wheel mounted upon the outer end of said second shaft, speed and travel reducing mechanism positioned in said casing and adapted to transmit rotary motion from said second shaft to said first shaft, a contact arm mounted on said first shaft and adapted to turn therewith, a stationary segment or table, a plurality of stationary electric contacts concentrically mounted upon said table and insulated from each other, a travelling bridge contact carried by said contact arm and adapted to be moved thereby into engagement with any one of said stationary contacts, said segment or table being corrugated in its periphery, a dog yieldingly carried by said contact arm and adapted to pass from one or another of the recesses forming said corrugations, and to engage the same, and elastic means for holding said dog in tension contact with said periphery.

In testimony whereof, I hereunto affix my signature, in presence of two witnesses.

MELVIN B. BENSON.

Witnesses:
EVANGELINE C. SLAIRD,
RICHARD H. WINTHROP.